Oct. 21, 1947.  E. V. BERGSTROM  2,429,545
METHOD AND APPARATUS FOR HYDROCARBON CONVERSION
Filed Sept. 20, 1946  2 Sheets-Sheet 1

INVENTOR
ERIC V. BERGSTROM
BY
John A. Crowley, Jr.
AGENT OR ATTORNEY

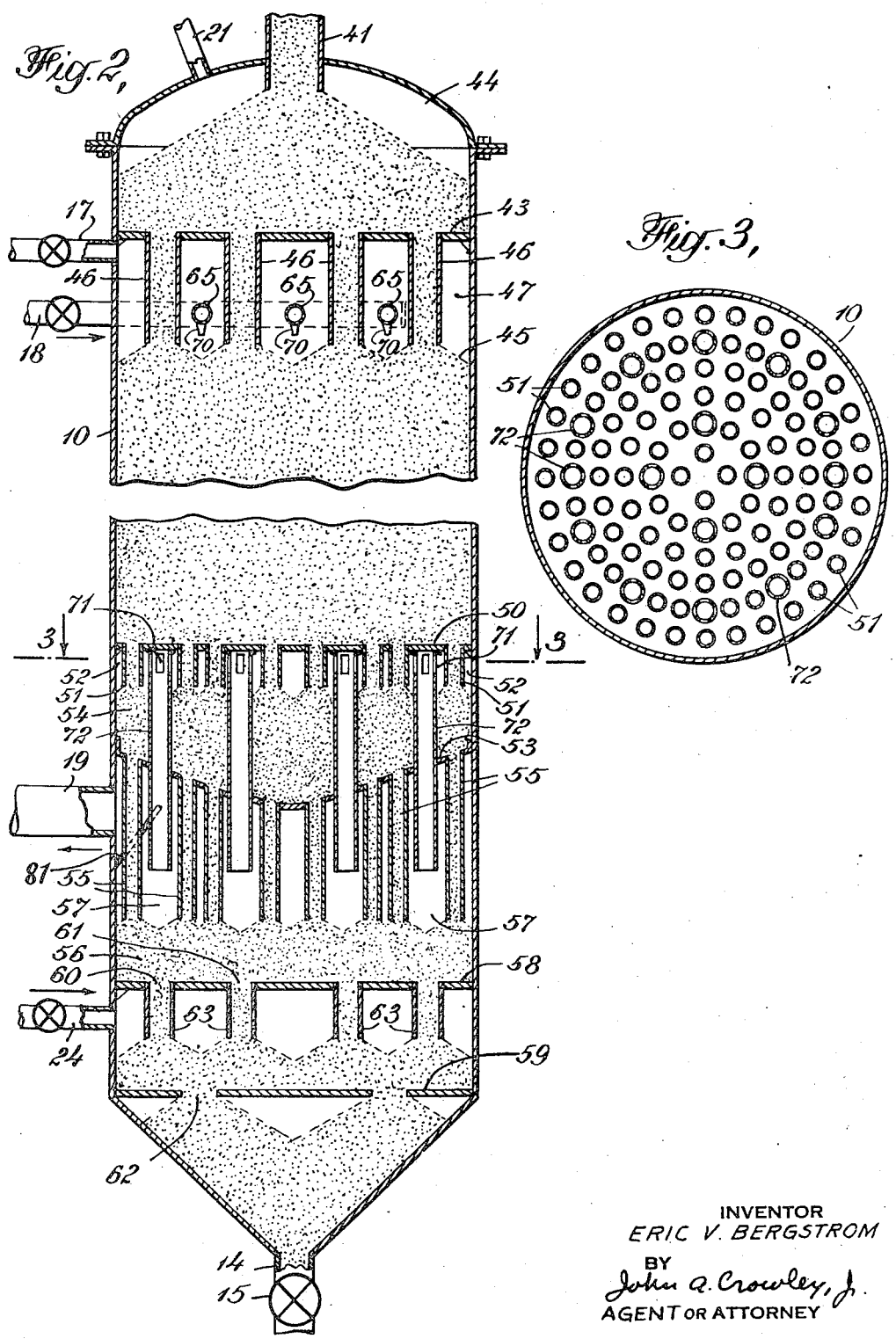

Patented Oct. 21, 1947

2,429,545

UNITED STATES PATENT OFFICE 2,429,545

METHOD AND APPARATUS FOR HYDROCARBON CONVERSION

Eric V. Bergstrom, Short Hills, N. J., assignor to Socony-Vacuum Oil Company, Incorporated, a corporation of New York Application September 20, 1946, Serial No. 698,379

10 Claims. (Cl. 196—52)

1

This invention has to do with a method and apparatus for conversion of fluid hydrocarbons in the presence of a particle-form solid contact material which may or may not be catalytic in nature.

Exemplary of the processes to which this invention may be applied are the catalytic cracking conversion of high boiling fluid hydrocarbons, the catalytic hydrogenation, dehydrogenation, aromatization, polymerization, alkylation, isomerization, reforming, treating or desulfurizing of selected hydrocarbon fractions. Also exemplary are the thermal cracking, viscosity breaking and coking of hydrocarbon fractions in the presence of heated inert, solid materials.

Typical of such processes is the catalytic cracking conversion of hydrocarbons, it being well known that high boiling fluid hydrocarbons may be converted to lower boiling gaseous, gasoline containing hydrocarbon products by exposure to a suitable adsorbent type catalytic material at temperatures of the order of about 800° F. and higher and at pressures usually above atmospheric. Such a process has recently been developed commercially into a continuous cyclic process wherein the solid catalyst is passed cyclically through a conversion zone wherein it is contacted with fluid hydrocarbons to effect the conversion thereof and through a regeneration zone wherein it is contacted with a combustion supporting gas such as air which acts to burn off from the catalyst a carbonaceous contaminant deposited thereon in the conversion zone.

This invention is particularly concerned with such cyclic conversion processes or gas-solid contacting processes wherein the particle-form contact material moves through the conversion zone or contacting zone as a substantially compact column and wherein gaseous reaction products of contacting gas and the used contact material are separately withdrawn from the conversion or contacting zone.

In such cyclic processes wherein the contact material is a catalyst it may partake of the nature of natural or treated clays, bauxite, inert carriers upon which catalytic materials such as metallic oxides have been deposited or certain synthetic associations of silica, alumina, or silica and alumina to which small amounts of other materials such as metallic oxides may be added for special purposes. In processes wherein the contact material is not catalytic in nature its purpose is usually that of a heat carrier and may take any of a number of forms, for example, spheres or particles of metals, stones or refractory materials such as mullite, zirkite, or a refractory material containing about 70% alumina and the remainder largely silica. In order to permit practical rates of gas flow through the contact material which is maintained as a substantially compact column in the conversion zone, the contact material should be made up of particles falling within the size range of about 3 to 100 mesh and preferably 4 to 20 mesh by Tyler standard screen analysis.

In such processes wherein the direction of gas flow through the reaction zone is countercurrent to the downward flow of the contact material, the maximum rate of gas flow should be limited to that which will not cause "boiling of the contact material" or serious interference with its flow, otherwise, serious difficulties arise such as channeling of the solid and gas flow and excessive attrition of the solid material. In many processes such as, for example, the conversion of liquid hydrocarbons to lower boiling gaseous products, it is desirable to pass the reactant fluid downwardly through the conversion zone concurrently with the contact material flow. In such processes a serious difficulty arises in the withdrawal of gaseous reactants from the contact material column within the conversion zone. In one form of operation practiced heretofore a row of inverted, spaced, collecting troughs was positioned in the column of contact material within the lower section of the reactor and gas was withdrawn through suitable pipes extending under the ends of the troughs. Such an arrangement is unsatisfactory due to serious entrainment of contact material in the gaseous streams withdrawn from the ends of the collecting troughs. This entrainment is no doubt partially due to the limited settling space available for settling out of entrained particles under the collecting troughs. It may be further due to the fact that the static pressure under each collecting trough progressively increases along its length with distance from the gas withdrawal point so as to cause a maximum rate of gas disengagement from the solid surface and of solid entrainment along that portion of the lengths of the collecting troughs nearest the end of gas withdrawal therefrom.

A major object of this invention is the provision in a process wherein a gaseous material is contacted with a substantially compact column of particle-form contact material of an improved method and apparatus for withdrawal of gas from said column without substantial entrainment of contact material particles.

Another object of this invention is the provision of an improved method and apparatus for conversion of a high boiling fluid hydrocarbon to a lower boiling gaseous hydrocarbon product in a confined zone in the presence of a substantially compact column of contact material particles flowing downwardly through said zone in the direction of the reactant flow.

A specific object is the provision in a hydrocarbon conversion process wherein the contact material moves downwardly as a substantially compact column of solid particles concurrently to the fluid reactant flow of a practical method and apparatus for withdrawal of gaseous conversion products from said column in the conversion zone without substantial entrainment of contact material particles in the effluent gas stream.

These and other objects of this invention will become apparent from the following detailed description of the invention. Before proceeding with the description, certain expressions employed herein in describing and in claiming this invention will be defined. The term "gaseous" as used herein unless specifically otherwise modified, is intended broadly to cover material existing in the gaseous phase under the particular operating conditions involved regardless of what may be the normal phase of that material under ordinary atmospheric conditions. The expression "contact material" unless otherwise specifically modified, is used herein in a broad sense to cover any solid material having suitable heat carrying and stability properties for the particular process application in which it is employed, and the expression is intended to broadly cover catalytic and non-catalytic materials.

The invention may be most readily understood by reference to the drawings attached hereto of which Figure 1 is an elevational view of an arrangement of a cyclic conversion system to which this invention is applied;

Figure 2 is an elevational view, partially in section of a conversion vessel constructed according to this invention;

Figure 3 is a sectional plan view taken along line 3—3 of Figure 2.

Figure 1:
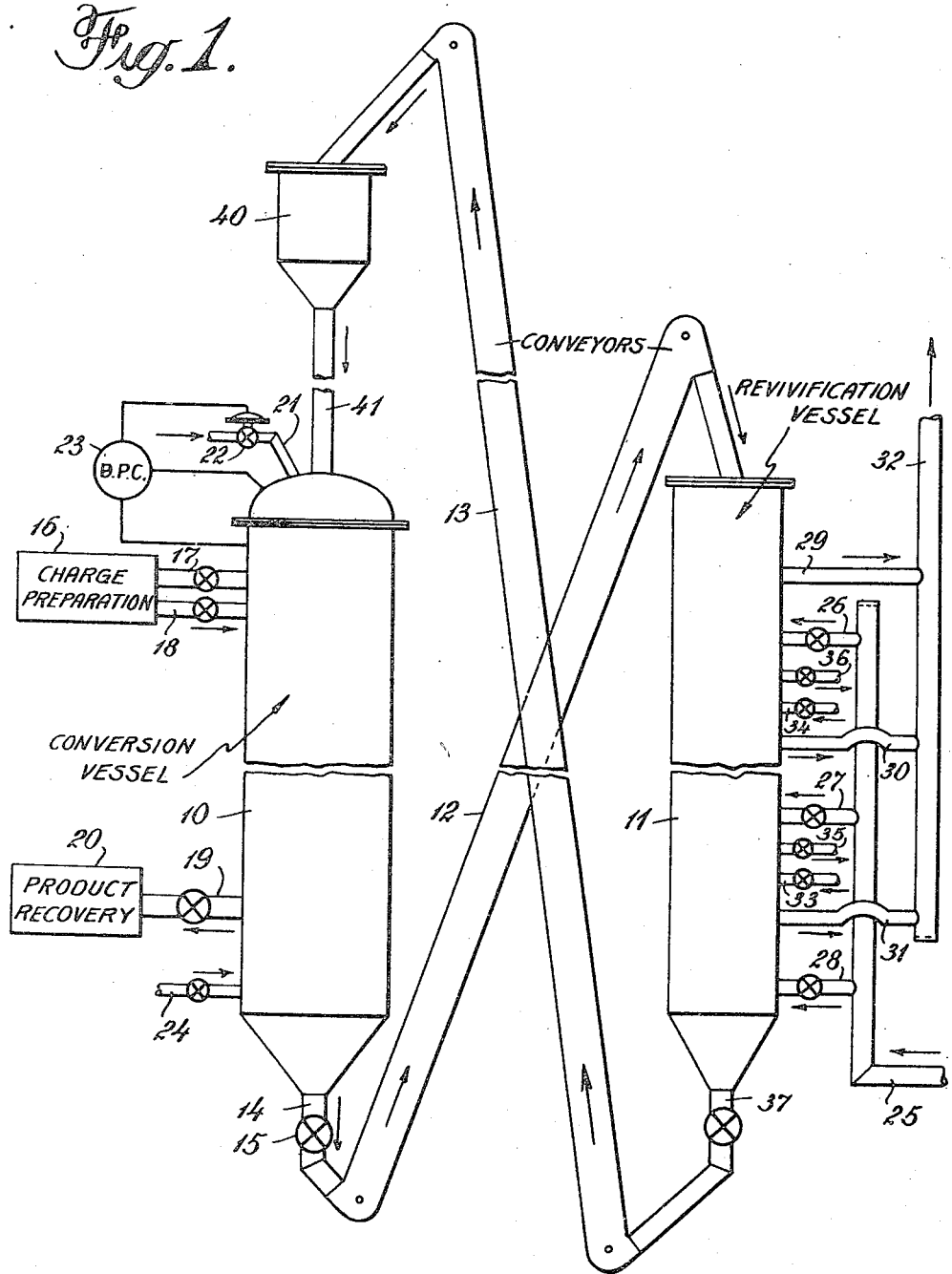

All of these drawings are highly diagrammatic in form.

Turning now to Figure 1, there is shown a conversion vessel 10, a regeneration or revivification vessel 11 and conveyors 12 and 13 for transfer of contact material between the conversion and regeneration vessels. In operation, particle-form contact material is supplied from hopper 40 through gravity feed leg 41 into the upper section of the conversion vessel 10. Used contact material is withdrawn from the lower end of vessel 10 through drain conduit 14. The rate of contact material flow is controlled by valve 15 on conduit 14 so that a substantially compact column of contact material is maintained within the conversion zone. The hydrocarbon charge to vessel 10 may exist in the gaseous phase or liquid phase or both. The charge may be vaporized and/or heated and separated into vapor and liquid fractions in a suitable charge preparation system 16 which may be of conventional design. Heated charge vapors may be admitted to the upper section of the conversion zone through conduit 17 and heated liquid charge may be admitted through conduit 18. Gaseous conversion products are withdrawn separately of the contact material, from the lower section of the conversion zone through conduit 19 through which it passes to a conventional product recovery system 20. An inert seal gas such as steam or flue gas may be admitted through conduit 21 into a seal zone maintained at the upper end of vessel 10 for the purpose of preventing hydrocarbon escape through the gravity feed leg. The rate of seal gas introduction may be so controlled by means of diaphragm actuated valve 22 and differential pressure control instrument 23 as to maintain a seal gas pressure in the seal zone slightly above the hydrocarbon pressure in the upper section of the conversion zone. An inert purge gas such as steam or flue gas may be introduced into the contact material column below the level of gaseous reactant withdrawal through conduit 24 for the purpose of purging gaseous reaction products from the outflowing used contact material. The used contact material is transferred by conveyor 12, which may be a continuous bucket elevator for example, to the upper end of regeneration vessel 11. The regeneration vessel shown is of the multi-stage type, well adapted for the regeneration of spent cracking catalysts. Air or oxygen containing gas is introduced from manifold 25 into several superposed burning stages through inlet conduits 26, 27 and 28. Flue gas may be withdrawn from these stages through conduits 29, 30 and 31, all connecting into outlet manifold 32. The contact material temperature may be controlled by passing a suitable cooling fluid through cooling tubes located in vessel 11 between the burning stages. Cooling fluid may be introduced into the cooling tubes (not shown) through communicating inlets 33 and 34 and withdrawn therefrom through communicating outlets 35 and 36. Regenerated contact material is withdrawn from vessel 11 through drain conduit 37 through which it passes to conveyor 13. The hot regenerated contact material is transferred by conveyor 13 to reactor supply hopper 40. While the regenerator described hereinabove is of the multi-stage type it will be understood that other types of regenerators adapted for regenerating contact materials may be employed within the scope of this invention. The type of regenerator or revivification vessel to be employed will vary depending upon the particular process involved. Any apparatus adapted to condition the contact material to a state satisfactory for re-use in the particular conversion process involved is contemplated to be within the scope of this invention. It should be further understood that this invention is not considered as limited to any particular position arrangement of conversion and regeneration vessels or to the particular apparatus described hereinabove for contact material introduction into the conversion vessel.

The improvement of this invention as applied to the conversion vessel 10 is shown in Figure 2 wherein 10 is the conversion vessel having solid inlet 41 at its upper end and outlet 14 at its lower end. A partition 43 is positioned across the upper section of the vessel 10 to provide a seal chamber 44 in the upper end of vessel 10. Contact material passes from seal chamber 44 onto the surface of the contact material column or bed 45 in the conversion chamber therebelow through uniformly distributed tubes 46 which depend from partition 43. The partition 43 and tubes 46 combine to provide a gas distribution space 47 above the contact material column in the conversion chamber. Vaporized hydrocarbons may be introduced into the gas space through conduit 17. A plurality of conduits 65 extend across the gas space 47, being closed on their ends within the gas space. These conduits connect on their opposite ends into a liquid feed manifold 48. A plurality of spaced spray devices 70 depend from each of the conduits 47. These devices are adapted to direct a spray of liquid charge onto the surface of bed 45. Other suitable means for introduction of liquid hydrocarbon charge may be substituted for the apparatus described, if desired. Across the lower section of the vessel 10 there is positioned a partition 50 from which depend a plurality of spaced tubes 51 which are substantially uniformly distributed with respect to the vessel horizontal cross-sectional area. The tubes 51 communicate with the bed above partition 50 and terminate on their lower ends a spaced distance below partition 50 so as to provide a single gas collecting space 52 below the partition 50 and surrounding the tubes 51. A second partition 53 is positioned across vessel 10 at a level substantially below the lower ends of tubes 51 so as to provide room for a bed of solid material 54 over the partition 53. A plurality of uniformly distributed tubes 55 depend from partition 53 for flow of solid material from the bed 54 onto the surface of another bed 56 a spaced distance below partition 53. The arrangement automatically provides a second gas space 57 in the vessel located below partition 53 and surrounding tubes 55. A conduit 19 connects through the shell of vessel 10 to communicate with the space 57. While partition 50 is shown as flat and partition 53 as dished, both may be dished or flat as desired. Two more partitions 58 and 59 are positioned at spaced vertical intervals below partition 53. In partition 58 there are provided two spaced concentric rows of holes 60 and 61 and in partition 59 there is provided one circular row of holes 62. Conduits may be positioned within each hole if desired. Thus conduits 63 depend from partition 58. The arrangement is such that a plurality of streams, uniformly distributed with respect to the vessel cross-sectional area are withdrawn from the bed 56. These streams are proportionately combined into a smaller number of streams passing through holes 62 in partition 59 which streams are horizontally staggered between the streams thereabove. Finally the streams from partition 59 are merged into a single stream flowing from vessel 10 through conduit 14. This arrangement insures substantially uniform withdrawal of contact material from all portions of the horizontal cross-sectional area of bed 56. In practice the number of partitions required may be two or more, increasing with increasing diameter of the vessel 10. If desired, the tubes 55 depending from partition 53 may be so arranged that partition 53 also serves as the uppermost partition in the solid flow control system described. A plurality of uniformly distributed vertical tubes 72 extend downwardly from the gas space 52 through partition 53 into the gas space 57. A convenient method to support these conduits is to weld or fasten them to the underside of partition 50, as shown. In such a case, holes 71 are provided in the tubes 72 to communicate their interiors with the gas space 52. In other arrangements the tubes 72 may merely terminate on their open upper ends in the gas space 52, other means suitable for supporting the tubes being provided. The tubes 72 are not rigidly fastened to partition 53 but slide through holes in the partition 53 which are sufficiently large to permit for movement of the tubes under thermal expansion or contraction, but said holes fit closely enough around the tubes to prevent solid flow into space 57. If the tubes 72 are not rigidly fastened to partition 50, they may then be rigidly fastened to partition 53. It will be understood that the tubes 51, 55 and 72 may be of any convenient cross-sectional shape and may be arranged on any of a number of patterns. The term tube as used in claiming the invention is intended in this broad sense. A pattern suitable for a circular vessel is shown in Figure 3, taken at line 3—3 of Figure 2. Identical elements bear the same numerals in Figures 2 and 3. Inasmuch as it is of vital importance to this invention that the gas spaces 52 and 57 be single gas spaces, the tubes 51 and 55 should be of substantially less horizontal dimension in every direction than the vessel 10. In some modifications, however, the tubes 72 may be rectangular in shape and extend substantially across the vessel.

In operation contact material enters the seal chamber 44 through conduit 41 and passes from the bottom of the seal chamber through tubes 46 onto the surface of the contact material column 45 in the conversion chamber. The contact material flows downwardly through an upper portion of the conversion chamber as a substantially compact bed or column of gravity flowing particles. The rate of solid flow is controlled by throttling by means of valve 15 on the outlet 14 from vessel 10. Contact material passes from the bottom of bed 45 through tubes 51 onto bed 54. At the same time heated gaseous hydrocarbon reactants are introduced to vessel 10 through conduit 17 and/or liquid hydrocarbons are introduced via conduit 18, pipes 65 and spray devices 70. The hydrocarbon reactants pass downwardly within the bed 45 to become converted to lower boiling gaseous products. The gaseous conversion products pass downwardly with and through the contact material streams in tubes 51, and the gaseous material disengages from the solid material at the lower ends of tubes 51 and enters gas collecting space 52. A certain amount of contact material is entrained by the gas into space 52. Most of the entrained material settles to bed 54, and that material which does not settle is carried by the gas stream through tubes 72 into the second gas space 57 wherein the entrained solids settle onto bed 56. The substantially solid-free gaseous conversion products are withdrawn from gas space 57 through conduit 19. Used contact material from bed 54 is shunted through gas space 57 in tubes 55 which deliver it onto bed 56. The solid material is then uniformly withdrawn from substantially all portions of the cross-sectional area of bed 56 in the manner described hereinabove. By throttling the solid flow at valve 15 in drain conduit 14 continuity of substantially compact material body is maintained upwardly from the level of valve 15 through the entire length of vessel 10 to inlet feed conduit 41 at its top. Inert seal gas such as steam may be admitted through conduit 21 into seal chamber 44 and purge gas may be admitted through conduit 24 into the space below partition 58. The purge gas passes upwardly through tubes 63 and bed 56 to be withdrawn with the gaseous reactants through conduit 19.

By the provision of partition 50 and tubes 51 at the bottom of the conversion zone a very simple and effective device is provided for disengagement of gas from solid particles. The arrangement described provides an exceptionally great amount of disengaging surface area all at substantially one level. However, in most concurrent flow operations which are characterized by very high rates of gas flow through the contact material bed, a certain amount of entrainment of solid particles into the gas space 52 occurs. If the gas were withdrawn from space 52 as it is through conduit 19 from space 57, this entrained solid material would be lost from the reaction vessel in the effluent gas stream. Moreover, in commercial vessels of very great cross-sectional area, if gas were withdrawn from a given location along the perimeter of space 52, a substantial difference in the static pressure at various locations in gas space 52 would arise due to the gas flow toward the outlet. This difference in static pressure would give rise to unequal rates of gas flow from the reaction zone through tubes 51, the flow being higher in those tubes depending into the lowest pressure area in the space 52. As a result, very poor disengagement and excessive solid entrainment would occur at the lower ends of those tubes through which the gas flow was highest. By the provision of plenum chamber 57 which is of substantial size and by passage of gas from space 52 into this chamber the entrained solids may be settled from the gas stream before its withdrawal from the reaction vessel. Moreover the tubes 72 communicating various portions of space 52 with the same plenum chamber 57 help to equalize the static pressure in all portions of space 52 thereby permitting better and more uniform gas-solid disengagement. In some modifications of the invention the lower ends of tubes 72 may be curved so as to admit gas horizontally into space 57 thereby improving the solid settling. A baffle plate 81 may be positioned in front of the opening to conduit 19 so as to prevent direct flow of gas from those tubes 72 nearest the outlet into the outlet. It is often desirable, especially in the case of vessels of very large diameter to provide several outlets such as 19 at spaced intervals around the gas space 57.

The method and apparatus of this invention may be employed in a wide variety of processes involving contact of gas with a column of particle-form solid material. The invention is particularly applicable to catalytic processes for the cracking conversion of liquid or vaporous hydrocarbon charges or both. In general such hydrocarbon conversion operations are conducted under temperatures within the range about 800° F. to 1100° F., the higher temperatures being employed for liquid charging stocks. Low pressures of the order of 5 to 30 pounds per square inch are generally employed in the conversion zone for cracking conversions. The oil charge space velocity may vary from about 0.3 to 10.0 volumes of oil (measured as liquid at 60° F.) per hour per volume of catalyst column within the reaction zone. The catalyst to oil throughput ratio may vary within the range about 1 to 20 parts of catalyst per part of oil by weight. In general the reactant charge is preheated to a temperature of the order of 600° F.–900° F. and all or part of the heat required for the conversion may be carried into the conversion zone in the catalyst. It will be understood that the particular apparatus dimensions employed will vary depending upon the particular operation and operating conditions involved. In general the number and size of tubes 51 should be such as will handle the maximum anticipated contact material flow while providing sufficient diengaging surface at their lower ends to prevent excessive boiling of the solid bed surface to a substantial level above the lower ends of said tubes. The tubes 55 should also be of sufficient size and number to handle the maximum anticipated contact material flow and the plenum chamber 57 should be in general of substantially greater depth than space 52. The tubes 72 should be of sufficient size and number to handle the maximum anticipated gas flow at a very low pressure drop, for example less than about 2 inches of water. As an example in a typical satisfactory conversion apparatus the tubes 51 extended to a common level about 6 inches below partition 50, the partition 53 was about 30 inches below partition 50, the tubes 55 extended to a level about two feet below partition 53 and the tubes 72 terminated about 17 inches below partition 53.

It should be understood that the particular details of apparatus construction and of operation and the examples of application of this invention given hereinabove are intended as exemplary and are not to be construed as limiting the scope of this invention except as it may be limited by the following claims.

I claim:

1. A method for conversion of fluid hydrocarbons to lower boiling gaseous hydrocarbons in the presence of a moving particle-form solid contact material which comprises: maintaining within a confined zone three superposed, substantially compact beds of said particle-form contact material each bed having a substantial gas space thereabove, supplying fresh contact material at a suitable conversion supporting temperature to the uppermost bed, introducing fluid hydrocarbon charge into the uppermost bed and passing the contact material and hydrocarbon charge downwardly in said uppermost bed to effect conversion of said charge to lower boiling gaseous hydrocarbons, withdrawing said gaseous hydrocarbons and used contact material from the bottom of said uppermost bed as a plurality of confined streams distributed across the horizontal cross-sectional area of said bed, directing said confined streams downwardly through the gas space over the next lower, intermediate bed and onto the surface of said intermediate bed, causing the gaseous products to disengage from the contact material at the surface of said intermediate bed and passing the disengaged gaseous products along with any entrained contact material particles as a plurality of horizontally spaced confined streams downwardly from the gas space above said intermediate bed, through said intermediate bed into the gas space above the lowermost bed, withdrawing gaseous conversion products from said last named gas space, passing contact material from the bottom of said intermediate bed as a plurality of confined streams distributed over the horizontal cross-sectional area of said bed through said gas space over said lowermost bed and onto the surface of said lowermost bed and withdrawing used contact material substantially uniformly from all portions of the horizontal cross-sectional area of said lowermost bed while throttling the rate of contact material withdrawal so as to maintain substantial continuity of substantially compact contact material body throughout the entire length of said confined zone.

2. A method for conversion of fluid hydrocarbons to lower boiling gaseous hydrocarbon products in the presence of a moving particle-form contact material which method comprises: introducing particle-form contact material into the upper section of a confined elongated conversion zone at a suitable temperature for said hydrocarbon conversion, passing said contact maucts in the presence of a moving particle-form contact material which method comprises: introducing particle-form contact material from a confined seal zone into the upper section of a confined elongated conversion zone at a suitable temperature for said hydrocarbon conversion, passing said contact material downwardly through an upper portion of said zone as a substantially compact bed of downwardly flowing particles, withdrawing contact material from the lower end of said bed by subdividing the bed into a plurality of confined substantially compact, vertical streams spaced apart and distributed substantially uniformly with respect the horizontal cross-sectional area of said confined conversion zone, the cumulative cross-sectional area of said streams being substantially less than the cross-sectional area of said zone so as to provide a single gas collecting space within said zone around said streams, directing the flow of said confined streams onto the surface of a second substantially compact bed of said contact material maintained at a lower level in said zone, similarly withdrawing contact material from the lower end of said second bed by similarly subdividing the bed into a plurality of confined streams so as to provide a second gas space of substantial area around said last named streams, directing the flow of said last named streams onto the surface of a third bed maintained at a still lower level in said zone, withdrawing used contact material from said third bed at a controlled rate, introducing heated fluid hydrocarbons onto the upper section of said conversion zone, passing said fluid hydrocarbons downwardly within said first named bed to effect conversion of said fluid hydrocarbons to lower boiling gaseous hydrocarbons, passing said gaseous hydrocarbons from the lower end of said conversion zone downwardly through said confined streams of contact material passing to said second bed, disengaging said gaseous hydrocarbons from said streams at their lower ends and collecting the gas in said single gas collecting space above said second bed, passing said gaseous hydrocarbons and any entrained contact material particles downwardly from said gas collecting space and into said second gas space maintained above said third bed as a plurality of confined streams originating at a plurality of spaced points in said gas collecting space said points being substantially uniformly distributed across said gas collecting space, withdrawing gaseous conversion products from said last named gas space, introducing an inert purge gas into said third bed to purge gaseous hydrocarbons from the control material and maintaining an inert gaseous pressure in said seal zone.

6. An apparatus for conversion of fluid hydrocarbons in the presence of a substantially compact column of particle-form contact material which comprises: a substantially vertical vessel adapted to confine a gas under pressure, means to introduce particle-form contact material to the upper section of said vessel, means to introduce a fluid hydrocarbon to the upper section of said vessel, a partition transversely positioned across said vessel within a lower portion thereof, a plurality of uniformly spaced tubes depending from said partition, said conduits communicating with the space above said partition and terminating a spaced distance therebelow so as to provide a gas collecting space immediately below said partition from which gas space solid flow from said column is excluded, a second partition across said vessel a spaced distance below the lower ends of said conduits, a second plurality of spaced tubes depending from said second partition, said last named conduits communicating with the space above said second partition and terminating a spaced distance below said second partition, so as to provide a solid settling gas space below said second partition, said last named tubes being of substantially greater length than the tubes depending from said first partition, means to withdraw contact material from the lower section of said vessel, means defining a plurality of confined passages for gas flow from a plurality of points in said gas collecting space to said solid settling gas space, and means to withdraw gas from said solid settling gas space.

7. An improved apparatus for gas solid contacting which comprises: a substantially vertical, confined vessel adapted to confine a contacting gas under pressure, means to introduce particle-form contact material into the upper section of said vessel, means to withdraw contact material from the lower end of said vessel, flow throttling means associated with said withdrawal means, means to introduce fluid reactants into said vessel, a partition positioned transversely across said vessel intermediate its ends, a plurality of uniformly distributed tubes depending from said partition adapted for flow of material from above said partition to a level in said vessel spaced below said partition, a second partition across said vessel a spaced distance below the lower ends of said tubes, a plurality of uniformly distributed tubes depending from said second partition adapted for flow of solid material from above said second partition to a level in said vessel a spaced distance below said second partition, conduit means communicating a location in said vessel below said first partition and above the lower ends of the tubes depending therefrom with a location within said vessel below said second partition and above the lower ends of the tubes depending therefrom and conduit means communicating the interior of said vessel at a level below said second partition and above the lower ends of the tubes depending therefrom with a location exterior of said vessel.

8. An improved apparatus for gas solid contacting which comprises: a substantially vertical, confined vessel adapted to confine a contacting gas under pressure, means to introduce particle-form contact material into the upper section of said vessel, means to withdraw contact material from the lower end of said vessel, flow throttling means associated with said withdrawal means, means to introduce fluid reactants into said vessel, a partition positioned transversely across said vessel intermediate its ends, a plurality of uniformly distributed tubes depending from said partition adapted for flow of material from above said partition to a level in said vessel spaced below said partition, a second partition positioned transversely across said vessel a spaced distance below the lower ends of said tubes, a plurality of uniformly distributed tubes depending from said second partition adapted for flow of solid material from above said second partition to a level in said vessel a spaced distance below said second partition, a plurality of uniformly spaced, substantially vertical tubes passing tightly through said second partition, the interior of said tubes communicating on their open upper ends with the space within said vessel below said first partition and above the lower ends of the tubes depending therefrom and on their open lower ends with the space below said second partition but terial downwardly through an upper portion of said zone as a substantially compact bed of downwardly flowing particles, withdrawing contact material from the lower end of said bed by subdividing the bed into a plurality of confined components distributed uniformly across the horizontal cross-sectional area of said confined zone, the cumulative cross-sectional area of said components being substantially less than the cross-sectional area of said zone so as to provide a single gas collecting space within said zone around said components having a substantial horizontal cross-sectional area, directing the flow of said confined components onto the surface of a second substantially compact bed of said contact material maintained at a lower level in said zone, similarly withdrawing contact material from the lower end of said second bed by similarly subdividing the bed into a plurality of confined components so as to provide a second gas space of substantial size around said last named components, directing the flow of said last named components onto the surface of a third bed maintained at a still lower level in said zone, withdrawing used contact material from said third bed at a controlled rate, introducing heated fluid hydrocarbons onto the upper section of said conversion zone, passing said fluid hydrocarbons downwardly within said first named bed to effect conversion of said fluid hydrocarbons to lower boiling gaseous hydrocarbons, passing said gaseous hydrocarbons along with said first named confined components onto the surface of said second bed, collecting said gaseous hydrocarbons in said gas collecting space over said second bed, passing said gaseous hydrocarbons and any entrained contact material particles separately of the main body of contact material as a confined stream from said gas collecting space into said gas space above said third bed to allow settling of entrained particles onto said third bed and withdrawing gaseous conversion products from said last named gas space.

3. A method for conversion of fluid hydrocarbons to lower boiling gaseous hydrocarbon products in the presence of a moving particle-form contact material which method comprises: introducing particle-form contact material into the upper section of a confined elongated conversion zone at a suitable temperature for said hydrocarbon conversion, passing said contact material downwardly through an upper portion of said zone as a substantially compact bed of downwardly flowing particles, withdrawing contact material from the lower end of said bed by subdividing the bed into a plurality of confined components distributed uniformly across the horizontal cross-sectional area of said confined zone, the cumulative cross-sectional area of said components being substantially less than the cross-sectional area of said zone so as to provide a single gas collecting space within said zone around said components having a substantial horizontal cross-sectional area, directing the flow of said confined components onto the surface of a second substantially compact bed of said contact material maintained at a lower level in said zone, similarly withdrawing contact material from the lower end of said second bed by similarly subdividing the bed into a plurality of confined components so as to provide a second gas space of substantial size around said last named components, directing the flow of said last named components onto the surface of a third bed maintained at a still lower level in said zone, withdrawing used contact material from said third bed substantially uniformly from all portions of its horizontal cross-sectional area while controlling the rate of such withdrawal such as to insure continuity of substantially compact contact material body from the level of contact material withdrawal from said third bed upwardly through said confined zone to the location of contact material introduction thereinto, introducing heated fluid hydrocarbons onto the upper section of said conversion zone, passing said fluid hydrocarbons downwardly within said first named bed to effect conversion of said fluid hydrocarbons to lower boiling gaseous hydrocarbons, passing said gaseous hydrocarbons along with said first named confined components onto the surface of said second bed, collecting said gaseous hydrocarbons in said gas collecting space over said second bed, passing said gaseous hydrocarbons and any entrained contact material particles separately of the main body of contact material as a plurality of horizontally spaced, substantially vertical, confined streams passing through said second bed into said gas space above said third bed to allow settling of entrained particles onto said third bed and withdrawing gaseous conversion products from said last named gas space.

4. A method for conversion of fluid hydrocarbons to lower boiling gaseous hydrocarbons in the presence of a moving particle-form solid contact material which comprises: passing particle-form contact material at a suitable temperature for said hydrocarbon conversion downwardly through a confined conversion zone as a substantially compact column, introducing fluid hydrocarbons into said zone and passing said fluid hydrocarbons downwardly within said column to effect the conversion thereof, withdrawing contact material from the lower section of said conversion zone as a plurality of substantially compact, confined streams uniformly distributed with respect to the horizontal cross-sectional area of said column and directing the flow of contact material from said confined streams onto the surface of a bed of said contact material maintained in the lower portion of a confined disengaging zone, passing gaseous conversion products through said streams from the lower section of said conversion zone into said disengaging zone and collecting gaseous products in a gas space maintained above said bed in said disengaging zone, withdrawing contact material from the lower section of said bed in said disengaging zone as a plurality of confined substantially compact streams uniformly distributed with respect the horizontal cross-sectional area of said bed and directing the flow of contact material from said last named streams onto the surface of a bed of said contact material maintained below a gas space for solid settling in a third confined zone, said gas space being substantially larger than said gas space in said disengaging zone, withdrawing contact material uniformly from said third zone at a controlled rate, passing the gas from said gas space in said disengaging zone into said gas settling space in said third zone as a plurality of confined streams emanating from a plurality of points distributed across the cross-sectional area of said gas space in said disengaging zone and withdrawing gaseous conversion products from said gas space in said third zone.

5. A method for conversion of fluid hydrocarbons to lower boiling gaseous hydrocarbon prodabove the lower ends of the tubes depending therefrom, at least one conduit for gas withdrawal connected through the shell of said vessel at a level below said second partition and above the lower ends of the tubes depending therefrom.

9. An apparatus for conversion of fluid hydrocarbons to lower boiling gaseous products comprising in combination: means defining an elongated, upright, confined conversion chamber, means defining a seal chamber above said conversion chamber, means to supply fresh contact material to said seal chamber, means to introduce an inert seal gas into said seal chamber, conduit means for flow of contact material from the bottom of said seal chamber to a level within said conversion chamber below its upper end, means to introduce fluid hydrocarbon reactant into the upper section of said conversion chamber, means defining a disengaging chamber below said conversion chamber, a plurality of conduits for gas and solid flow extending from the bottom of said conversion chamber and terminating within said disengaging chamber a spaced distance below the upper end thereof, said conduits being uniformly distributed across the bottom of said conversion chamber, means defining a third chamber below said disengaging chamber, a plurality of uniformly distributed conduits for solid flow extending downwardly from the bottom of said disengaging chamber and terminating within said third chamber a spaced distance below its upper end, a plurality of tubes for gas flow extending from a level within the upper section of said disengaging chamber to a level within the upper section of said third chamber, means to withdraw gas from the upper section of said third chamber and means to withdraw solid material from the lower end of said third chamber.

10. In a gas solid contacting vessel wherein a gaseous material is contacted with a substantially compact column of particle-form solid contact material the improved apparatus for substantially separate withdrawal of gaseous material from said column which comprises in combination: a partition extending transversely across said vessel at a level intermediate its ends, said partition having a plurality of openings therein substantially uniformly distributed across the cross-sectional area of said vessel, said openings being of less horizontal dimension in every direction than said vessel, a tube tightly fitted in each of said openings, said tube being open on its upper end to communicate with the portion of the vessel above said partition and terminating on its open lower end a spaced distance below said partition so as to provide a single gas collecting space below said partition and around said tubes from which space gravity flow of solid from said column of contact material in said vessel is excluded, a second partition positioned across said vessel a spaced distance below the lower ends of said tubes, said partition also having a plurality of uniformly distributed openings therein, a tube tightly fastened into each of said openings in said second partition said tube being open on its upper end to communicate with the portion of the vessel above said partition and terminating on its open lower end a spaced distance below said second partition so as to provide a second single gas space surrounding the tubes depending from said second partition, conduit means communicating said first gas space with said second gas space within said vessel, said conduit means being so positioned as to exclude gravity flow of solid thereinto, from said column and means to withdraw gas from said second gas space.

ERIC V. BERGSTROM.

REFERENCES CITED

The following references are of record in the file of this patent:

UNITED STATES PATENTS

| Number | Name | Date |
| --- | --- | --- |
| 2,414,812 | Houdry | Jan. 28, 1947 |
| 1,422,007 | Soddy | July 4, 1922 |
| 2,327,175 | Conn | Aug. 17, 1943 |
| 2,364,453 | Layng et al. | Dec. 5, 1944 |
| 2,410,309 | Simpson et al. | Oct. 29, 1946 |
| 2,409,596 | Simpson et al. | Oct. 15, 1946 |
| 2,386,846 | Dunham | Oct. 16, 1945 |
| 2,386,670 | Evans | Oct. 9, 1945 |

OTHER REFERENCES 8-page leaflet, "Houdry Pioneer" of October 1946, vol. 2, No. 1. Published by Houdry Process Corp., 25 Broad Street, New York 4, N. Y. (Copy in Division 31.) 196–52.2.